3,297,769
PREPARATION OF 1-NITROPARAFFINS FROM 1-NITROOLEFINS BY CATALYTIC HYDROGENATION
Conrad Michalski, Media, and Giovanni A. Bonetti, Wynnewood, Pa., assignors to Atlantic Richfield Company, Philadelphia, Pa., a corporation of Pennsylvania
No Drawing. Filed Feb. 1, 1966, Ser. No. 523,868
9 Claims. (Cl. 260—644)

This invention relates to a method for the preparation of 1-nitroparaffins by the catalytic hyrogenation of 1-nitroolefins.

In U.S. Patent No. 3,226,442 to Bonetti et al., is is disclosed that 1-nitroolefins may be catalytically hydrogenated to produce saturated aliphatic primary amines by the use of a hydrogenation catalyst and in the presence of a dioxane-water or ethanol-water solvent wherein the water constitutes from 5 volume percent to 50 volume percent of the mixture.

It now has been found that if the 1-nitroolefin is catalytically hydrogenated in the presence of a palladium on charcoal cataylst and a solvent such as dioxane, tetrahydrofuran or ethyl acetate either in the anhydrous condition or in admixture with water, wherein the water constitutes not more than 4 volume percent of the solvent-water mixture it is possible to selectively saturate the double bond of the nitroolefin without hydrogenating the nitro group and thus convert the nitroolefin to a 1-nitroparaffin instead of a primary amine as shown in the patent.

It is, therefore, an object of this invention to provide a method for preparing 1-nitroparaffins.

It is another object of this invention to provide a method for preparing 1-nitroparaffins in high yields by the direct selective catalytic hydrogenation of a 1-nitroolefin.

It is another object of this invention to provide a method for preparing 1-nitroparaffins from a mixture of 1-nitroolefins and nitroalcohols and to separate the 1-nitroparaffin from the nitroalcohol.

Other objects of this invention will be apparent from the detailed description that follows and from the claims.

In accordance with this invention a 1-nitroolefin having the formula R—CH=CH—NO$_2$, wherein R is an alkyl radical having from 1 to 24 carbon atoms, is contacted with hydrogen in the presence of a palladium on charcoal hydrogenation catalyst and in the presence of certain specific solvents to selectively saturate with hydrogen the double bond of the olefin and produce the corresponding 1-nitroparaffin in substantially quantitative yields, i.e. yields above 90 percent of theoretical.

Although the alkyl group of the 1-nitroolefin having the formula set forth above may contain from 1 to 24 carbon atoms, preferably it should contain from 1 to about 8 carbon atoms. The 1-nitroolefins may be prepared by a variety of known methods, e.g. U.S. Patent No. 3,192,248 to Bonetti et al. shows a method for preparing nitronitrites and 1,2-dinitroparaffins from alpha-olefins and U.S. Patent No. 3,192,271 to Bonetti et al. shows a mehod for converting the 1,2-dinitroparaffins to 1-nitroolefins. Other methods are known, particularly those described in the foreign literature.

The palladium on charcoal catalyst is a conventional commercially available material. One method for the preparation of such catalysts is set forth by Mannich and Thiele, Ber. Deutches Pharm. Ges., 26, 36–38 (1916).

In general the commercial catalyst comprises 10 weight percent palladium on activated charcoal. This catalyst is preferred for the instant invention. While other hydrogenation catalysts such as palladium-ruthenium on charcoal, platinum on charcoal, platinum or palladium on alumina, nickel on kieselguhr, platinum black and Raney nickel have been utilized in this reaction, in general, they cause at least some hydrogenation of the nitro group with the formation of the oxime and of the amine and therefore they are not preferred.

A particularly critical feature of the instant invention is the use of certain specific solvents. The solvents which are utilized are dioxane, tetrahydrofuran, and ethyl acetate. These solvents may be utilized in the anhydrous condition or they may contain rather small amounts of water, i.e. not more than about 4 volume percent of water based on the volume of the solvent-water mixture. It has been found that if larger amounts up to about 50 volume percent of water are present in the solvent-water mixture, the hydrogenation reaction does not stop with the saturation of the double bond but continues until the nitro group is converted to the primary amine.

The reaction conditions which have been found to be suitable for use in the selective hydrogenation of the instant invention are temperatures in the range of from about 20° C. to 80° C. with pressures in the range of from about 25 p.s.i.g. to 80 p.s.i.g. of hydrogen. In general, there are optimum temperatures and pressures within these ranges which may be obtained experimentally for each specific 1-nitroolefin to be hydrogenated. However, the important feature of the invention is the use of the above-described specific solvents which will give yields in excess of 90 percent of theoretical and, therefore, the determination of optimum temperatures and pressures will increase this yield at most only by a few percent.

The amount of solvent employed may vary over a rather wide range. It has been found that useful results are obtained when the volume of the solvent employed ranges between 1 and 10 liters per mole of 1-nitroolefin and preferably when the volume ranges between 2 and 6 liters per mole of nitroolefin. The preferred range for the amount of catalyst is from 2 grams per mole of nitroolefin to 15 grams per mode of nitroolefin, however, these amounts are not critical. From 10 grams to 12 grams of catalyst per mole of nitroolefin has been found to be a useful amount.

The following examples are provided to illustrate certain specific embodiments of the invention but are not to be construed as limiting the invention thereto. In these examples the amount of catalyst (10 weight percent Pd on charcoal) ranged between 10 and 12 grams per mole of 1-nitroolefin and the solvent ranged from about 2.5 liters per mole to 7 liters per mole of 1-nitroolefin. Each experiment was carried out in a Parr shaker apparatus under a hydrogen pressure of about 60 p.s.i.g.

*Example I*

A sample of 1-nitrohexene was charged to the Parr apparatus with an amount of dioxane corresponding to 2.5 liters per mole of the 1-nitrohexene and an amount of palladium on charcoal catalyst corresponding to 12 grams per mole of 1-nitrohexene. Hydrogen was introduced to a pressure of 60 p.s.i.g. and the reaction carried out at a temperature of 25° C. After about 8 minutes the hydrogenation of the 1-nitrohexene to the 1-nitrohexane was essentially quantitative and no further hydrogenation occurred although the reaction conditions were maintained for an additional 72 minutes.

The same reaction was carried out under the same conditions except that the reaction temperature was raised to 60° C. At the end of 10 minutes the conversion of the 1-nitrohexene to 1-nitrohexane was complete and no further hydrogenation occurred although reaction conditions were maintained for an additional 70 minutes.

*Example II*

A sample of 1-nitrooctene was charged to the Parr apparatus with an amount of dioxane corresponding to 5 liters per mole of 1-nitrooctene and an amount of palladium on charcoal catalyst corresponding to 12 grams per mole of 1-nitrooctene. Hydrogen was introduced to a pressure of 60 p.s.ig. and the reaction carried out at a temperature of 23° C. to 28° C. After about 8 minutes the hydrogenation of the 1-nitrooctene to the 1-nitrooctane was complete with essentially a quantitative conversion and no further hydrogenation occurred although the reaction conditions were maintained for an additional 52 minutes.

The same reaction was carried out utilizing the same amounts of catalyst and solvent except that the solvent was tetrahydrofuran. The reaction temperature was maintained between 22° C. and 25° C. In this experiment the conversion of the 1-nitrooctene to 1-nitrooctane also was complete at the end of 8 minutes with essentially quantitative conversion. No further hydrogenation occurred during the additional 52 minutes the reaction conditions were maintained.

In another experiment utilizing tetrahydrofuran at reaction temperatures of 30° C. to 33° C. the same results were obtained as at the lower temperatures.

*Example III*

In another experiment like that of Example II, 1-nitrooctene was hydrogenated to 1-nitrooctane in the presence of ethyl acetate as the solvent and at a temperature of 25° C. to 29° C. After 20 minutes the hydrogenation was complete with essentially quantitative yields of the nitroparaffin and a continuation of the reaction conditions produced no further hydrogenation.

*Example IV*

In order to demonstrate the criticality of the solvent a sample of 1-nitrooctene was charged to the Parr apparatus with an amount of isooctane (2,2,4-trimethylpentane) corresponding to about 2 liters per mole of 1-nitrooctene and an amount of palladium on charcoal catalyst corresponding to about 10 grams per mole of 1-nitrooctene. Hydrogen was introduced to a pressure of 60 p.s.i.g. and the reaction carried out at a temperature of 24° C. After about 15 minutes the hydrogenation was complete, however, the product was the primary amine and not 1-nitroparaffin. No 1-nitroparaffin was produced which could be isolated during the reaction.

In another experiment a sample of 1-nitrooctene was charged to the Parr apparatus with an amount of dioxane and water as the solvent corresponding to about 5 liters per mole of the 1-nitrooctene with an amount of palladium on charcoal catalyst corresponding to about 11 grams per mole of 1-nitrooctene. The water in the solvent mixture amounted to approximately 17 volume percent. Hydrogen was introduced to a pressure of 60 p.s.i.g. and the reaction carried out at a temperature of 25° C. The hydrogenation reaction was not complete after 1½ hours, however, the product at that time was predominantly the primary amine corresponding to complete hydrogenation of the 1-nitrooctene.

*Example V*

An experiment was carried out wherein a sample of 1-nitrooctene was charged to the Parr apparatus with an amount of dioxane corresponding to about 7 liters per mole of the 1-nitrooctene and with an amount of palladium on charcoal catalyst corresponding to about 11 grams of catalyst per mole of 1-nitrooctene. Hydrogen was introduced to a pressure of about 60 p.s.i.g. and the reaction carried out at a temperature of 25° C. It was found that after 10 minutes the conversion of the 1-nitrooctene to 1-nitrooctane was essentially complete and no further hydrogenation was occurring. After about 45 minutes total reaction time an amount of water was added such that the volume of water amounted to 12.5 percent of the total volume of water and dioxane. It was noticed that further hydrogenation began immediately in the direction of complete conversion to the primary amine. This demonstrates that if water is present in the solvent mixture as described in the Bonetti et al. Patent No. 3,226,442, the nitroolefin is converted to the corresponding saturated primary amine. Other experiments were carried out wherein small amounts of water up to about 4 percent based on the total volume of water and solvent were utilized and it was found that the 1-nitroolefin was hydrogenated to form the 1-nitroparaffin without the production of the saturated primary amine.

As has been described hereinbefore the nitration of alpha-olefins produces a mixture of dinitroparaffins and nitronitrites. This mixture may be converted by means of a low molecular weight alcohol or alcohol-water mixture in the presence of a small amount of base to produce a mixture of the nitroalcohol and the 1-nitroolefin. The formula of the 1-nitroolefin is R—CH=CH—NO$_2$, and for the nitroalcohol,

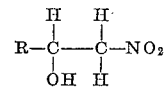

wherein R is an alkyl radical having from 1 to 24 carbon atoms. Heretofore it was not possible to separate the nitroalcohol and the nitroolefin by distillation since the nitroolefin in the presence of the nitroalcohol decomposes, rearranges and reacts with the nitroalcohol to give dark resinous mixtures or in some instances it reacts with explosive violence.

In accordance with the instance invention experiments have been carried out which show that the 1-nitroolefin can be hydrogenated to the 1-nitroparaffin as shown in the above examples when the 1-nitroolefin is in admixture with the nitroalcohol. The resulting mixture of 1-nitroparaffin and nitroalcohol can then be readily separated by distilling the nitroparaffin from the nitroalcohol since the boiling point of the nitroparaffin is several degrees lower than that of the nitroalcohol.

We claim:

1. A method for preparing a 1-nitroparaffin which comprises catalytically hydrogenating a charge stock selected from the group consisting of a 1-nitroolefin and a mixture of a 1-nitroolefin with a nitroalcohol, said nitroolefin having the formula R—CH=CH—NO$_2$ and said nitroalcohol having the formula

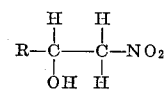

wherein R is an alkyl radical containing from 1 to 24 carbon atoms in the presence of a palladium on charcoal hydrogenation catalyst and a solvent selected from the group consisting of dioxane, tetrahydrofuran and ethyl acetate, said hydrogenation being carried out in the temperature in the range of from 20° C. to 80° C. under a pressure in the range of from about 25 p.s.i.g. to 80 p.s.i.g. of hydrogen and thereafter separating and recovering the 1-nitroparaffin.

2. The method according to claim 1 wherein the solvent is admixed with water in an amount such that the water constitutes not more than about 4 volume percent of the solvent-water mixture.

3. The method according to claim 1 wherein the solvent is dioxane.

4. The method according to claim 1 wherein the solvent is tetrahydrofuran.

5. The method according to claim 1 wherein the solvent is ethyl acetate.

6. The method according to claim 2 wherein the solvent-water mixture is dioxane-water.

7. The method according to claim 1 wherein the R alkyl radical contains 6 carbon atoms.

8. The method according to claim 1 wherein the R alkyl radical contains 4 carbon atoms.

9. The method according to claim 1 wherein the charge stock is a mixture of a 1-nitroolefin with a nitroalcohol and the 1-nitroparaffin produced in the hydrogenation is separated from the nitroalcohol by distillation.

References Cited by the Examiner

UNITED STATES PATENTS 2,854,496  9/1958   Wright _____ 260—644 X
3,156,723  11/1964  Seifert _____ 260—644 X CARL D. QUARFORTH, *Primary Examiner.*

L. A. SEBASTIAN, *Assistant Examiner.*